(No Model.)
C. A. BLESSING.
TRAP FOR BATH TUBS, SINKS, &c.
No. 325,486. Patented Sept. 1, 1885.
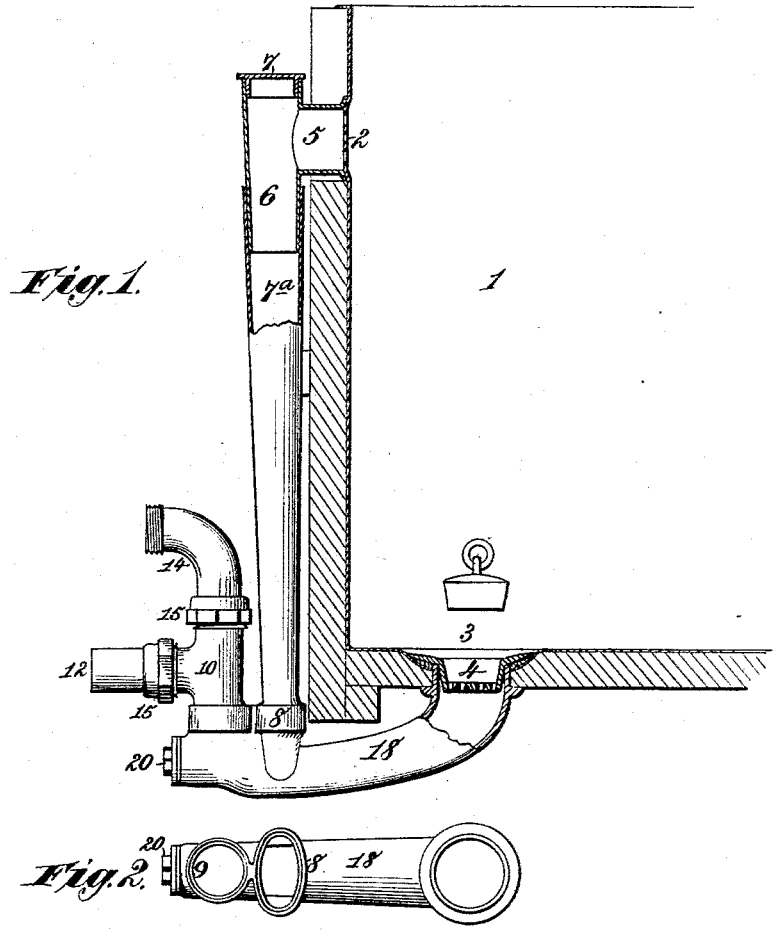
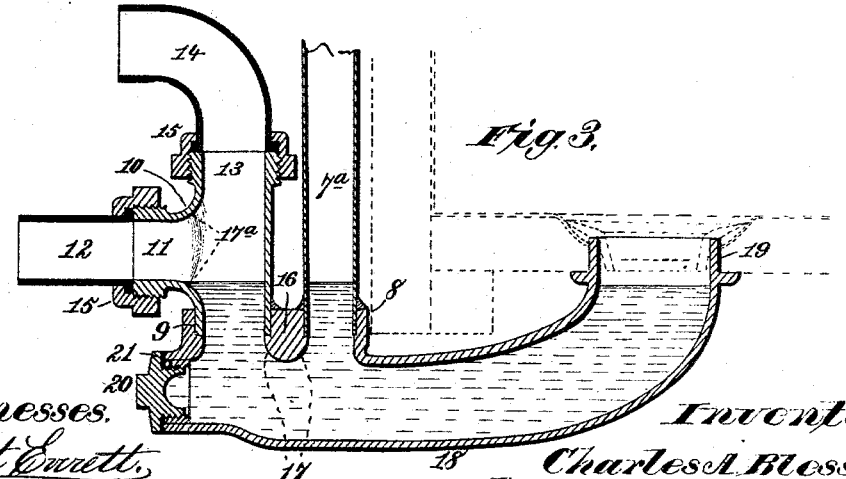
Witnesses.
Robert Everett.
J. A. Rutherford.
Inventor.
Charles A. Blessing.
By James L. Norris
Atty.

UNITED STATES PATENT OFFICE.

CHARLES A. BLESSING, OF PHILADELPHIA, PENNSYLVANIA.

TRAP FOR BATH-TUBS, SINKS, &c.

SPECIFICATION forming part of Letters Patent No. 325,486, dated September 1, 1885.

Application filed June 15, 1885. (No model.)

*To all whom it may concern:*

Be it known that I, CHARLES A. BLESSING, a citizen of the United States, residing at Philadelphia, in the county of Philadelphia and State of Pennsylvania, have invented new and useful Improvements in Traps for Bath-Tubs, Sinks, &c., of which the following is a specification.

It is the purpose of the present invention to simplify and improve the construction of traps for bath-tubs, whereby the same may be reduced to dimensions proportionate to the space allowed therefor. It is also my purpose to combine with such a trap an overflow-pipe which may be easily cleaned, and having such a form that the elbow of the vent-pipe may be brought close to the tub, to so construct the trap that it may be easily cleared from obstructing matter, and to form the seats for the several pipe connections in such a manner that solid substances entering the trap will pass into the waste-pipe without choking.

My invention consists in the several novel features of construction and combinations of parts hereinafter fully set forth, and definitely pointed out in the claims.

Referring to the drawings forming part of this application, Figure 1 is a view, partly in vertical section and partly in elevation, showing my invention. Fig. 2 is a plan view of the integral casting forming the trap, the overflow, vent, and waste pipes being removed. Fig. 3 is a vertical section taken longitudinally, the parts being shown upon a somewhat larger scale.

In the said drawings, the reference-numeral 1 designates a bath-tub having an overflow, 2, and outlet 3, the latter being provided with a plug or washer, 4, which is secured in place to the bath-tub lining in the usual manner. This washer is provided with a rubber stopper. The overflow is formed by swaging the metal forming the end of the tub slightly outward and then perforating it, substantially in the manner set forth in an application for patent filed of even date herewith.

With the overflow 2 is connected a pipe, 5, having a flange which is soldered upon the shoulder of the swaged portion. Said pipe opens into a vertical pipe, 6, having an upwardly-projecting portion covered by a cap, 7, which may be removed for the purpose of cleaning the pipe. The pipe 6 stands a little below the overflow, and is jointed to a pipe, 7ª, which has its diameter contracted in one direction and expanded in the other, said pipe being soldered at its lower end upon a seat, 8. The contraction mentioned enables me to bring the elbow of the vent-pipe closer to the overflow-pipe 7ª, thus assembling the parts within the least possible space.

Upon the rear end of the trap is formed a seat, 9, into which is either soldered or cast with the trap in one casting the threaded waste-pipe branch 10, with outlet 11, which receives the waste-pipe, swivel and nut 15, and the vertical branch or outlet 13, which receives a head or straight swivel, 14, and nut 15, communicating with the vent-pipe. Both swivels are flanged at their ends, and are connected with the flanged nuts 15. Between the entrance to the waste-pipe and that to the overflow-pipe 7ª is a septum, 16, forming part of the seat for each pipe. The interior angles of this septum are rounded, as shown at 17, to permit the passage of any solid substance light enough to float, such as pieces of matches and similar foreign matter, which might otherwise catch upon the angles and obstruct the passage. A similar curve is given to the angles 17ª at the mouth of the waste-pipe for the same purpose.

The reference numeral 18 denotes the trap, which is formed of a single casting, having a flanged head, 19, which is connected with the outlet of the tub. From the point of connection it is curved downward and then rearward, and the entrance to the waste is upon a level with the floor of the tub, whereby water will always remain in the trap upon a level just below the plug closing the outlet.

At the lower end of the trap is formed an opening, which is closed by a screw-cap, 20, the threaded neck of which engages with a brass bushing, 21, soldered in the neck of the trap. By removing this cap the water in the trap is discharged, and the chamber may be cleared of obstructions by any suitable device.

It will be noticed that by my invention the waste-pipe 12 has open and free communication with the vent-pipe 14, while at the same time each of the passages by which gas might back up and enter the house through the outlet or overflow openings is completely water-sealed. The consequence is, that sewer-gas backing up the waste-pipe will merely pass through the elbow or coupling 14 of the vent-pipe and be carried off. In this manner all possibility of the gas-pressure breaking the water-seal by driving the fluid in the trap up through the outlet or overflow and any siphoning of the trap are effectually avoided, and also the tub and overflow ventilated.

My invention may be applied not only to bath-tubs, but to sinks, basins, and other analogous purposes.

I propose to use, in connection with this invention, the oval overflow-strainer shown in my application filed at the same time herewith.

Having thus described my invention, what I claim as new, and desire to secure by Letters Patent, is—

1. The combination, with a trap for bath-tubs and sinks, of an overflow having its diameter diminished in one direction and increased in the other, and a coupling rising from the trap immediately in rear of said pipe, substantially as described.

2. In a trap for bath-tubs and other purposes, the combination, with a water-sealing chamber having outlets leading to the waste-pipe and the vent-pipe, of a pipe connecting said sealing chamber with the overflow-opening of the tub, said pipe being carried above the overflow-opening and provided with a removable cap, substantially as described.

3. In a trap for bath-tubs and analogous purposes, the combination, with the water-sealing chamber, of a T-coupling connecting the waste and vent pipes to the end of the trap, an overflow-pipe entering the trap between said coupling and the tub, a detachable cap upon the upper end of the overflow-pipe and upon the lower projecting end of the water-chamber, substantially as described.

4. In a trap for bath-tubs and analogous purposes, the combination, with a water-sealing chamber having communication with the outlet, of a coupling rising from the rear end of the water-chamber, and having two branches, 11 and 13—the former for the waste and the latter for the vent pipes—and an overflow-pipe, 7ª, entering the chamber between the said coupling and the tub, a septum, 16, depending into the chamber between the overflow and the waste pipes, and having rounded angles 17, substantially as described.

5. In a trap for bath-tubs and analogous purposes, the combination, with the sealing-chamber, of a T-coupling connected to the chamber at its rear end, an overflow-pipe between the coupling and the tub, waste and vent pipes connected to said coupling, the latter having rounded angles 17ª, and a septum, 16, between the overflow and waste having rounded angles 17, substantially as described.

In testimony whereof I affix my signature in presence of two witnesses.

CHAS. A. BLESSING.

Witnesses:
 NICHOLAS SPANG,
 W. VEY.